(12) United States Patent
Kim

(10) Patent No.: US 6,480,478 B1
(45) Date of Patent: Nov. 12, 2002

(54) DATA DEMODULATOR FOR MULTICODE CDMA SYSTEM

(75) Inventor: Jung-Sik Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/193,313

(22) Filed: Nov. 17, 1998

(30) Foreign Application Priority Data

Nov. 17, 1997 (KR) ............................................ 97-60594

(51) Int. Cl.[7] .............................................. H04B 7/216
(52) U.S. Cl. ...................................... 370/335; 370/342
(58) Field of Search ................................. 370/342, 335; 375/147, 130, 136, 149

(56) References Cited

U.S. PATENT DOCUMENTS

| | | | | |
|---|---|---|---|---|
| 5,463,660 A | * | 10/1995 | Fukasawa et al. | 375/205 |
| 5,764,687 A | * | 6/1998 | Easton | 375/206 |
| 5,889,815 A | * | 3/1999 | Iwakiri | 370/342 |
| 5,943,329 A | * | 8/1999 | Ohgoshi et al. | 370/335 |
| 6,128,276 A | * | 10/2000 | Agee | 370/335 |
| 6,133,964 A | * | 10/2000 | Han | 375/321 |

\* cited by examiner

Primary Examiner—Chau Nguyen
Assistant Examiner—Ron Abelson
(74) Attorney, Agent, or Firm—Dilworth & Barrese, LLP

(57) ABSTRACT

A data demodulator for a multicode Code Division Multiple Access (CDMA) system is provided. The system transmits data by allocating multiple codes to each user. In the data modulator, a code generating part generates a local code for despreading input channel signals and local orthogonal codes for orthogonally despreading the despread channel signals. A time error estimator generates time error information for the despread channel signals and outputs the time error information to the code generating part. A symbol processing part includes N symbol processing units, where N is the number of codes allocated to each user. The N symbol processing units demodulate symbols despread by the local orthogonal codes into original symbols. A symbol deskewer classifies the demodulated symbols by the respective codes and writes the classified symbols in sequence into a two-dimensional memory.

5 Claims, 1 Drawing Sheet

DATA DEMODULATOR FOR MULTICODE CDMA SYSTEM

BACKGROUND OF THE INVENTION

1. Field of the Invention

The present invention relates generally to demodulators in mobile communication systems and, in particular, to a demodulator for despreading data transmitted in a multicode CDMA system that allocates multiple codes to each user.

2. Description of the Related Art

In transmitting data, a Code Division Multiple Access (CDMA) system allocates a single code to each user. A time tracker used in a common CDMA system is structured to demodulate data by tracking the single code. However, to meet an increasing demand for fast data transmission in radio mobile communication, a technology has been proposed which allocates multiple codes to each user in order to transmit an increased amount of data per unit time. Nonetheless, the conventional time tracker cannot time-track the input data spread by the multiple codes to extract the data. Further, the conventional time tracker cannot demodulate the data by the codes.

SUMMARY OF THE INVENTION

It is an object of the present invention to provide a demodulator for despreading data in a multicode Code Division Multiple Access (CDMA) system in order to demodulate the data.

To achieve the above object, there is provided a data demodulator for a multicode CDMA system, the system transmitting data by allocating multiple codes to each user. The data demodulator includes a code generating part that generates a local code and local orthogonal codes for respectively despreading input channels signals and orthogonally despreading the despread channel signals. A time error estimator generates time error information for the despread channel signals and outputs the time error information to the code generating part. A symbol processing part includes N symbol processing units, where N is the number of codes allocated to each user. The N symbol processing units demodulate symbols despread by the local orthogonal codes into original symbols. A symbol deskewer classifies the demodulated symbols by the respective codes and writes the classified symbols in sequence into a two-dimensional memory.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
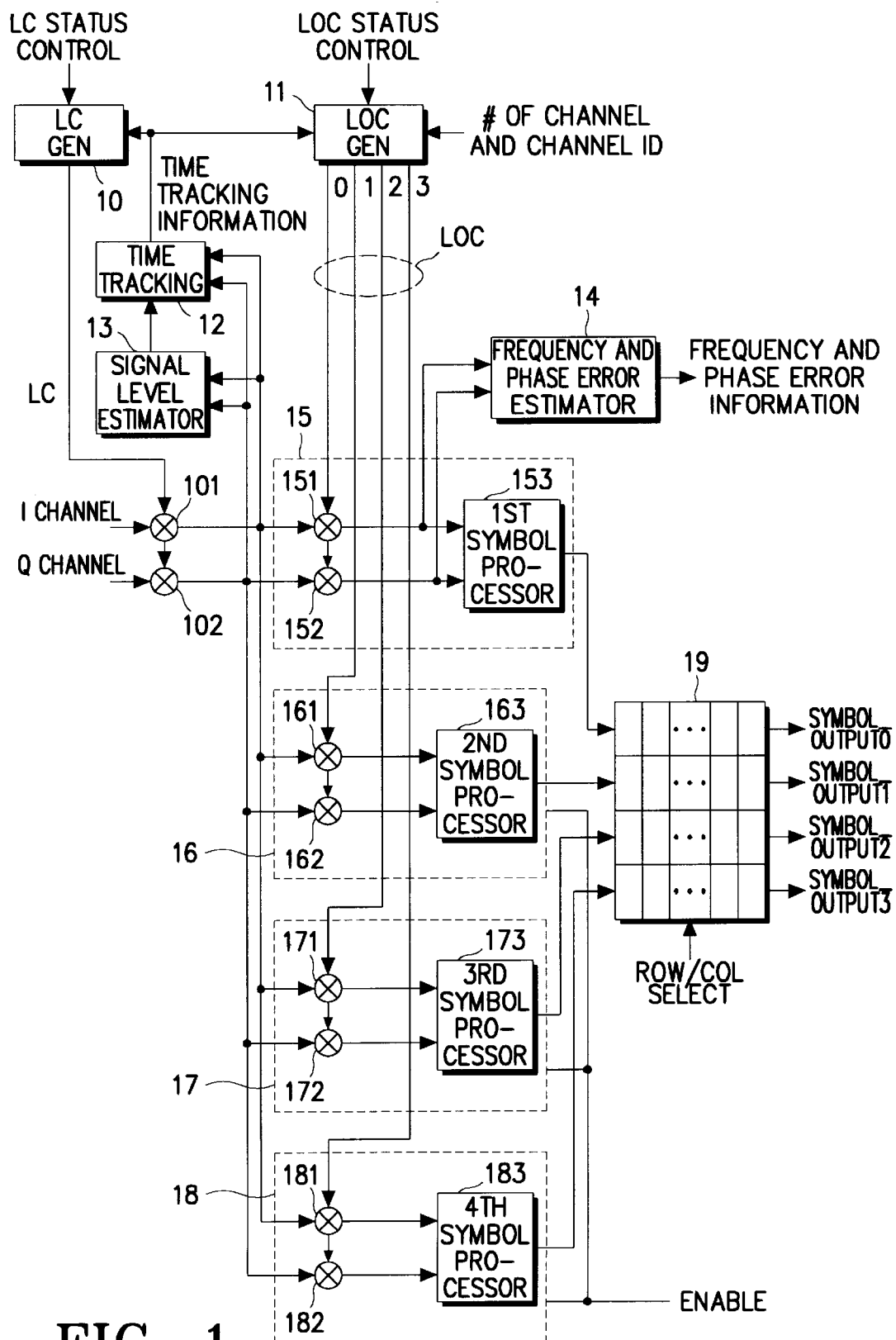
FIG. 1 is a block diagram illustrating the structure of a demodulator for demodulating data in a multicode CDMA system according to an embodiment of the present invention.

A preferred embodiment of the present invention will be described herein below with reference to the accompanying drawing. In the following description, well known functions or constructions are not described in detail so as not to obscure the invention in unnecessary detail.

In a multicode Code Division Multiple Access (CDMA) system, data is transmitted by allocating multiple codes to each user. FIG. 1 illustrates the structure of a demodulator for demodulating data in a multicode CDMA system according to an embodiment of the present invention. The demodulator despreads transmitted data by the respective codes to demodulate the data. In the illustrative embodiment by way of example, four codes are allocated to each user.

The demodulator includes: a local code (LC) generator 10; a local orthogonal code (LOC) generator 11; an error estimator composed of a time tracking part 12 and a frequency and phase error estimator 14; first to fourth symbol processing units 15–18 having first to fourth symbol processors 153, 163, 173 and 183, respectively; and a symbol deskewer 19 having a two-dimensional memory structure. The local code (LC) generator 10 generates a local code LC for despreading channel signals. The local orthogonal code (LOC) generator 11 generates local orthogonal codes LOC for orthogonally despreading the despread channel signals. The time tracking part 12 and the frequency and phase error estimator 14 respectively estimate time error information and frequency and phase error information.

The local code generator 10 generates the local code LC for despreading the channel signals in response to a local code status control signal. Multipliers 101 and 102 respectively multiply I (Inphase) and Q (Quadrature) channel input signals by the local code LC in order to generate despread channel signals. The local orthogonal code generator 11 generates the local orthogonal codes LOC for orthogonally despreading the despread channel signals in response to a local orthogonal code status control signal and the channel number and ID. First (151, 152), second (161, 162), third (171, 172) and fourth (181, 182) multipliers multiply the despread channel signals output from multipliers 101 and 102 by the corresponding local orthogonal codes LOC to output orthogonally despread channel signals. Specifically, first multipliers 151 and 152 respectively multiply the despread channel signals output from multipliers 101 and 102 by the local orthogonal code 0. The local orthogonal code 0 corresponds to a code first allocated to the user. Similarly, second to fourth multipliers ((161, 162), (171, 172), and (181, 182)) respectively multiply the despread channel signals output from multipliers 101 and 102 by the local orthogonal codes 1, 2 and 3. Codes 1, 2 and 3 correspond to subsequent codes allocated to the user.

The first symbol processor 153 demodulates the orthogonally despread symbols output from first multipliers 151 and 152 into original symbols according to a data rate of the system and the number of codes per symbol. Similarly, the second symbol processor 163 demodulates the orthogonally despread symbols output from second multipliers 161 and 162 into original symbols according to the data rate of the system and the number of codes per symbol. The third symbol processor 173 demodulates the orthogonally despread symbols output from third multipliers 171 and 172 into original symbols according to the data rate of the system and the number of codes per symbol. Finally, the fourth symbol processor 183 demodulates the orthogonally despread symbols output from fourth multipliers 181 and 182 into original symbols according to the data rate of the system and the number of codes per symbol. The number of symbol processors is identical to the number of codes allocable to each user. When the number of allocated codes is below the maximum number of codes allocable to each user, first to fourth processors 153, 163, 173 and 183 are controlled, in response to an enable control signal, to be in a power-off state or an idle state where power consumption is minimum.

The time tracking part 12 generates time error information for the despread channel signals output from multipliers 101 and 102, and provides the time error information to local code generator 10 and local orthogonal code generator 11. The local code generator 10 and the local orthogonal code generator 11 generate a corrected local code LC and corrected local orthogonal codes LOC, respectively, according to the time error information generated form the time tracking part 12. In general, a demodulator uses one or more time trackers and, thus, requires a controller for gathering information output from the several time trackers. To provide the information to such a controller, the demodulator of the invention further includes a signal level estimator 13 which outputs signal level information. In addition, frequency and phase error estimator 14 generates frequency and phase error information for the orthogonally despread channel signals output from first multipliers 151 and 152 and outputs the frequency and phase error information to a local oscillator (not shown). Here, time tracking part 12 and the frequency and phase error estimator 14 generate corresponding error information by using only the first allocated code 0 among the multiple codes.

The symbol deskewer 19 classifies the demodulated multicode symbol data output from the first to the fourth symbol processors according to the codes, and writes the demodulated multicode symbol data in sequence into respective rows of the two-dimensional memory in response to a row/column select signal. Accordingly, it is possible to store the multicode data in parallel or obtain data in a frame unit, by properly applying row/column addressing to the two-dimensional memory. In this manner, the demodulator according to the invention avoids employing a multiplexer, which is required when using a one-dimensional memory. Thus, the demodulator can perform a desired function in a shorter access time. Further, although the frame structure of the data is changed in relation to the multiple codes, the demodulator may control data read/write by generating appropriate addresses, thereby flexibly coping with a change in system specification.

As stated above, in the data demodulator according to the present invention, the time error and the frequency and phase error are corrected by using only the first allocated code. Moreover, the symbol deskewer having the two-dimensional memory structure controls operation of the symbol processing units. Thus, it is possible to minimize power consumption and adaptively cope with the variable frame structure by appropriately utilizing the properties of the multiple codes in the multicode CDMA system environment. In addition, it is possible to realize a demodulator capable of extending system bandwidth and improving the data rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data demodulator for a multicode Code Division Multiple Access (CDMA) system, the system transmitting data by allocating multiple codes to each user, the data demodulator comprising:
   code generating means for generating a local code and a plurality of local orthogonal codes for respectively despreading input channel signals and orthogonally despreading the despread channel signals;
   time error estimating means for generating time error information for the despread channel signals and outputting the time error information to the code generating means;
   symbol processing means including N symbol processing units, where N is a maximum number of local orthogonal codes allocable to each user, each said symbol processing unit demodulating symbols despread by each local orthogonal code into original symbols, wherein the number of enabled symbol processing units corresponds to the number of local orthogonal codes allocated to said user, and wherein the remaining symbol processing units are disabled; and
   symbol deskewing means for classifying the demodulated symbols according to the codes and writing the classified symbols in sequence into a two-dimensional memory.

2. The data demodulator as claimed in claim 1, further comprising frequency and phase error estimating means for generating frequency and phase error information for the symbols despread by the local orthogonal codes and outputting the frequency and phase error information to a local oscillator.

3. The data demodulator as claimed in claim 2, wherein said time error estimating means and said frequency and phase error estimating means respectively generate the time error information and the frequency and phase error information using only one of the allocated multiple codes.

4. The data demodulator as claimed in claim 2, wherein said time error estimating means and said frequency and phase error estimating means respectively generate the time error information and the frequency and phase error information using only a first allocated multiple code.

5. The data demodulator as claimed in claim 1, wherein each of said symbol processing units comprises:
   first and second multipliers for multiplying the channel signals despread by the local signal by the corresponding local orthogonal code; and
   a symbol processor for demodulating the symbols output from the first and second multipliers into the original symbols according to a data rate of a system and a number of codes per symbol.

* * * * *